M. M. MAY.
COOKING UTENSIL.
APPLICATION FILED SEPT. 24, 1920.
1,389,770.
Patented Sept. 6, 1921.
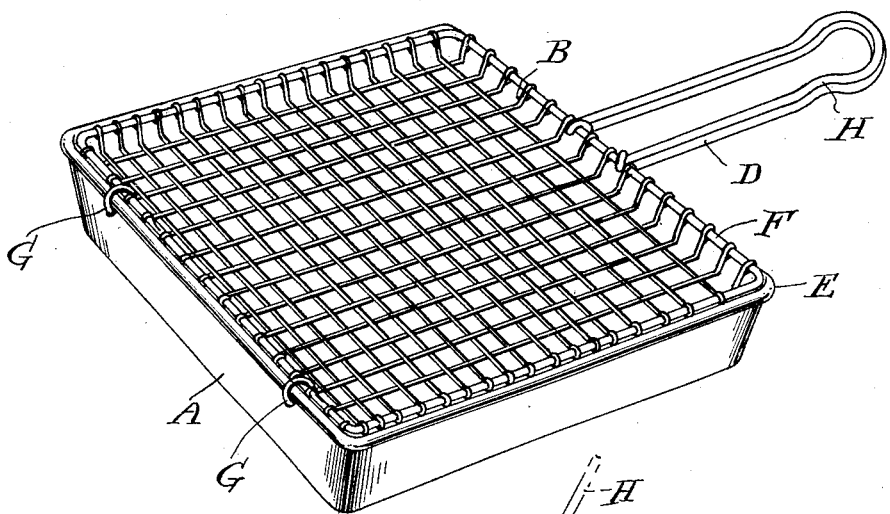
Fig. 1.
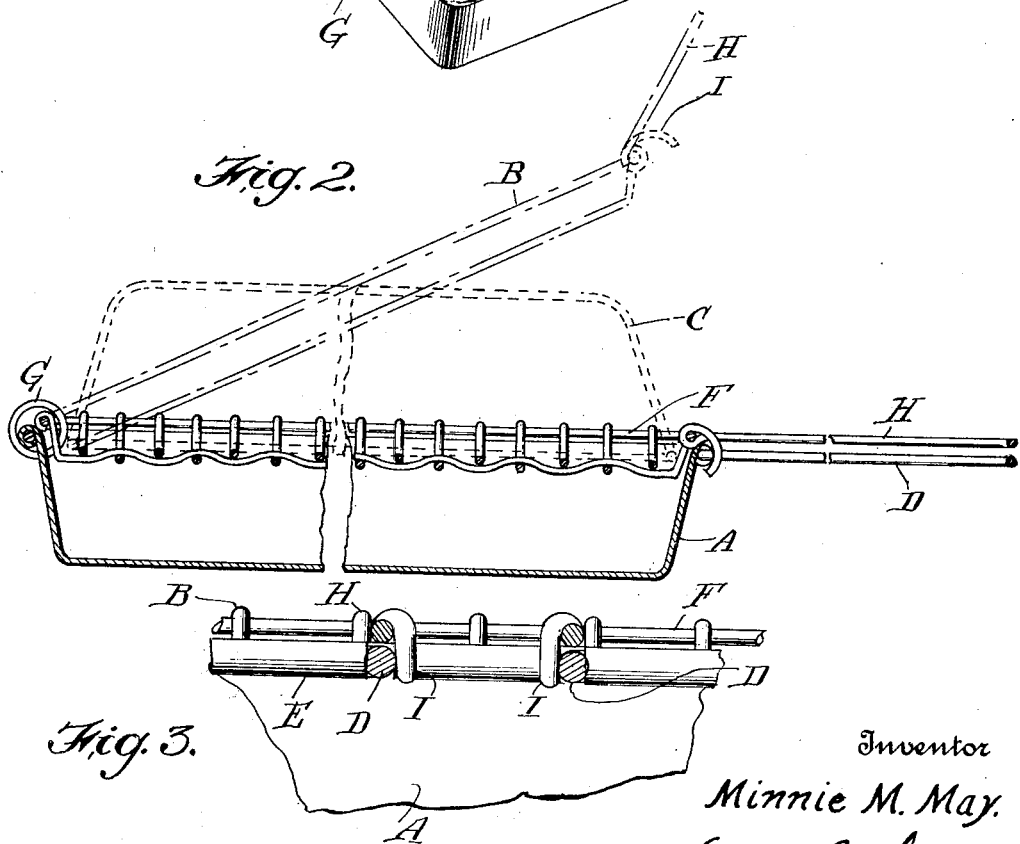
Fig. 2.
Fig. 3.
Inventor
Minnie M. May.
By Harold C. Thorne.
Attorney

UNITED STATES PATENT OFFICE.

MINNIE M. MAY, OF EVANSVILLE, INDIANA.

COOKING UTENSIL.

1,389,770. Specification of Letters Patent. Patented Sept. 6, 1921.

Application filed September 24, 1920. Serial No. 412,491.

*To all whom it may concern:*

Be it known that I, MINNIE M. MAY, a citizen of the United States, residing at Evansville, in the county of Vanderburg and State of Indiana, have invented certain new and useful Improvements in Cooking Utensils, of which the following is a specification.

This invention relates generally to cooking utensils, and more particularly to certain new and useful improvements in utensils adapted for use as toasters, warming pans, broilers, bakers, steamers, cornpoppers, and the like.

The object of the invention is to improve and simplify the construction of such devices and render them inexpensive to manufacture, durable and sanitary, and save fuel as compared with other methods and utensils now in use.

Further objects and details of the invention will appear as described in connection with the accompanying drawings, and hereinafter set forth and claimed.

Referring to the drawings forming part of this specification, like characters of reference designate corresponding parts in the three figures, in which, Figure 1, is a perspective view of one embodiment of my invention, Fig. 2, is a vertical sectional view thereof, showing a cover in connection with the device in outline, and Fig. 3, is an enlarged detail view.

Referring to the drawings, the cooking utensil comprises a rectangular pan A, and a wire frame B, into which may rest a pan or cover C.

The pan A, has an imperforate bottom and may be formed from a metal blank pressed into shape as illustrated or in any desired manner. A suitable handle D, is provided, which as shown in the drawings is an extension of the wire reinforcement for the bead E, at the top of the pan.

The wire frame B, is made so as to fit the pan A, of wire meshing with its peripheral edges bent upwardly, and bent around a reinforcing wire F. The upper edges of the frame rest upon the bead E, of the pan A, and the bottom of the frame projects into the pan sufficiently so that the imperforate side of the pan will prevent currents of air from passing under and across bread placed on the frame for toasting.

The frame B, may be hinged to pan A, by means of rings G, and a handle H, may be pivoted to the frame B, for swinging it back, as represented in dotted lines in Fig. 2. This handle is formed of a piece of wire similar to handle D, and has its ends bent around reinforcing wire F, as a pivot and curved as represented at I, so as to engage the bead E, of pan A, for fastening the frame B, in position, when the two handles D, and H, are in engagement with each other.

A utensil such as represented, having a pen A, with an imperforate bottom will prevent smoke and fumes from passing through when making toast. If desired it may be used for heating water, or as a steamer, in which case a pan C, is employed as outlined in Fig. 2. This pan is constructed so as to conform in shape with the pan A, and frame B, and rest therein with its edges engaging the bottom of frame B, so as to prevent currents of air from entering it. When the cover is used the utensil is also adapted for baking purposes, and a variety of other uses.

When the pan is placed over the heat, the temperature within the pan becomes equalized and distributed and is not so intense as to burn the food placed on the wire mesh frame and the result is that the food is properly toasted, cooked or baked.

One of the principal functions of my invention resides in the fact that the heat is not direct from the combustion or fire to the food, but is retarded and equalized by the imperforated bottom of the pan, and since the heat is constant and equable the food is properly cooked through and nicely browned on the surface without charring or burning the same.

My invention is simple in construction, can be manufactured and reach the users at low cost, is very efficient for its purposes and can be used in so many different ways in cooking food, is sanitary, durable, compact, and occupies but small space, when shipping, storing, etc.—is a very useful utensil which can be used by an army in the field, or by campers, or by persons compelled to live out in the open—as this utensil can be used whenever heat is applied to the bottom of the pan.

In reduction to practice I have found the form of my invention illustrated in the drawings and referred to in the foregoing description, as the preferred embodiment, is the most practical; yet realizing that the conditions concurrent with the adoption of my device will necessarily vary, I desire to emphasize the fact that various minor changes in details of construction, proportion and arrangement of parts, may be resorted to when required, without sacrificing any of the advantages of my invention as defined in the claims.

What I claim as my invention, and desire to secure by Letters Patent is:

1. A cooking utensil comprising a pan having an imperforate bottom and inclosed sides, and a handle therefor, a woven wire frame hinged to the pan having edges adapted to rest on the upper edges of the pan and a flat bottom adapted to extend into the pan below the upper edges thereof, a handle for said wire frame and means on said handle adapted to coöperate with the pan for fastening the members together.

2. A cooking utensil as set forth in claim 1 provided with a cover comprising a pan having sides the edges of which are adapted to rest within the wire frame engaging the bottom thereof.

3. A utensil comprising a pan having a peripheral bead or flange at its upper edge, and provided with a handle extending from one side thereof, a member of said utensil hinged to a side of the pan opposite its handle, and a handle comprising a wire member pivoted to the last said member by having its end bent around a portion thereof opposite the hinged portion, as a pivot, and extending and curved downwardly so that when said hinged member is in engagement with the pan and said handles engage each other, the curved portion of said second handle will engage with the bead or flange on the pan for fastening the members together.

In testimony whereof I affix my signature.

MINNIE M. MAY.